United States Patent Office 3,542,813
Patented Nov. 24, 1970

3,542,813
1-AZIDOMETHYL-STEROIDS AND PROCESS FOR THEIR MANUFACTURE
Oskar Jeger, Zollikerberg, Zurich, and Hans Ueli Wehrli, Schaffhausen, Switzerland, assignors to Ciba Corporation, New York, N.Y., a corporation of Delaware
No Drawing. Filed May 17, 1968, Ser. No. 729,941
Claims priority, application Switzerland, May 24, 1967, 7,347/67
Int. Cl. C07d 7/18
U.S. Cl. 260—343.2
15 Claims

ABSTRACT OF THE DISCLOSURE 1-azidomethyl-3-oxo-2-oxa-steroids of the androstane series, for instance those of the formula

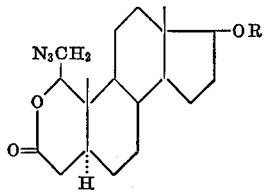

in which R is hydrogen or an acyl radical, and homologous compounds, such as their 17α-alkyl derivatives, and isomers, e.g. analogous compounds of the 5β-androstane series, are new and have an antagonistic activity towards testosterone. The new compounds are prepared from corresponding 1-hydroxymethyl-3-oxo-2-oxa-steroids.

SUMMARY OF THE INVENTION

The present invention concerns and has for its object the provision of new androstane compounds having the following partial formula of ring A:

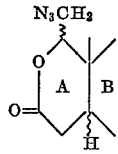

in which the rings A and B may be cis- or trans-fused, the substituent in position 1 has α- or β-configuration and which are oxygenated in position 17, that is to say contain a free or functionally modified hydroxyl or oxo group, a process for their manufacture and pharmaceutical preparations containing said new compounds. The invention also concerns the new 1-hydroxymethyl-3-oxo-2-oxa-5α- or 5β-androstane compounds and their esters which are used as starting materials in the process of this invention and their precursors, the 1-hydroxymethyl-3-hydroxy-2-oxa-5α- or 5β-androstane compounds oxygenated in 17 position and their esters and ethers.

DESCRIPTION OF THE PREFERRED EMBODIMENTS

The 17-oxygenated 1-azidomethyl-3-oxo-2-oxa-steroids of the androstane series may contain further substituents in the 17α-position and in other vacant positions of the steroid skeleton and in the rings B, C or D also double bonds.

Specially valuable are the compounds of the following formulae:

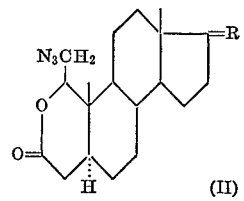 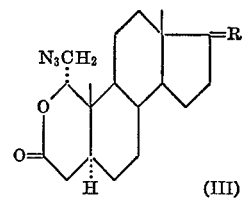

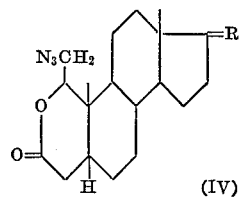 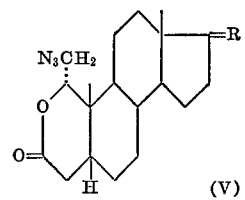

that is to say 1β-azidomethyl-3-oxo-2-oxa-17R-5α-androstanes, 1α - azidomethyl-3-oxo-2-oxa-17R-5α-androstanes, 1β-azidomethyl-3-oxo-2-oxa-17R-5β-androstanes and 1α-azidomethyl-3-oxo-2-oxa-17R-5β-androstanes in which R stands for an oxo or a lower alkylenedioxy group or for a free, esterified or etherified β-positioned hydroxyl group together with a hydrogen atom or a lower aliphatic saturated or unsaturated, unsubstituted or substituted hydrocarbon residue.

The said esterified hydroxyl groups are above all those derived from organic carboxylic acids of the aliphatic, alicyclic, aromatic or heterocyclic series, especially those containing 1 to 18 carbon atoms, for example from formic, acetic, propionic acid, butyric acids, valeric acids such as n-valeric acid or trimethylacetic, trifluoracetic acid, caproic acids such as β-trimethylpropionic acid or diethylacetic acid, the oenanthic, caprylic, pelargonic, capric, undecyclic acids, for example undecylenic acid, lauric, myristic, palmitic or stearic acids, for example oleic acid, cyclopropane-, -butane-, -pentane- and -hexane-carboxylic acid, cyclopropylmethane-carboxylic acid, cyclobutylmethanecarboxylic acid, cyclopentylethanecarboxylic acid, cyclohexylethanecarboxylic acid, cyclopentyl-, cyclohexyl- or phenylacetic acids or -propionic acids, from benzoic acid, phenoxyalkane acids such as phenoxyacetic acid, dicarboxylic acids such as succinic acid, phthalic acid, quinolic acid, furan-2-carboxylic acid, 5-tertiary butyl-furan-2-carboxylic acid, 5-bromo-furan-2-carboxylic acid, from nicotinic or isonicotinic acid, or from sulphonic acids such as benzenesulphonic acids, or from inorganic acids, for example phosphoric or sulphuric acids.

As etherified hydroxyl groups there may be mentioned above all those which are derived from alcohols containing 1 to 8 carbon atoms, such as lower aliphatic alkanols, for instance ethanol, methanol, propanol, isopropanol, the butyl or amyl alcohols, or from araliphatic alcohols, especially from monocyclic aryl-lower aliphatic alcohols such as benzyl alcohol, or from heterocyclic alcohols such as α-tetrahydropyranol or -furanol.

The lower aliphatic hydrocarbon residue in position 17α- may be saturated or unsaturated, unsubstituted or substituted, for example by halogen atoms. Such a residue contains preferably 1 to 4 carbon atoms and is especially the methyl, ethyl, propyl, vinyl, allyl, methallyl, ethynyl, propynyl, trifluoropropynyl or trichloropropynyl radical.

A lower alkylenedioxy group in position 17 is especially the ethylenedioxy group.

The new compounds possess valuable pharmacological properties. They display above all an antagonistic activity towards testosterone as can be shown in animal tests, for example on the capon. The new compounds may therefore be used as anti-androgens.

Of special value are, for example 1β-azidomethyl-17β-hydroxy-3-oxo-2-oxa-5α-androstane and its 17-esters, 1β-azidomethyl-17α-methyl - 17β - hydroxy-3-oxo-2-oxa-5α-androstane, 1β-azidomethyl-17α-ethinyl - 17β - hydroxy-3-oxo-2-oxa-5α-androstane, 1β-azidomethyl-3,17-dioxo-2-oxa-5α-androstane, 1β - azidomethyl-3-oxo-17-ethylenedioxy-2-oxa-5α-androstane and the corresponding compounds that contain the 5H-atom in the β-position and the 1-azidomethyl group in the α-position.

Special mention deserves 1β-azidomethyl-17β-hydroxy-3-oxo-2-oxa-5α-androstrane and its 17-acetate which for example on the capon, given locally in a dose from 0.1 to 1 mg./animal, display a pronounced anti-testosterone effect.

The new products are also valuable intermediates for the manufacture of other useful substances, especially of pharmacologically active compounds.

The process for the manufacture of the new compounds according to this invention is characterized in that in reactive esters of 17-oxygenated 1-hydroxymethyl-3-oxo-2-oxa-5α- or -5β-androstane compounds the reactive esterified 1-hydroxy-methyl group is converted into the 1-azidomethyl group and, if desired, in a resulting 17-oxygenated 1-azidomethyl-3-oxo-2-oxa-5α- or -5β-androstane functionally modified hydroxyl or oxo groups are liberated in known manner or free hydroxyl or oxo groups are functionally modified, and/or in position 17 a saturated or unsaturated, unsubstituted or substituted hydrocarbon residue is introduced in known manner.

More especially, 17-oxygenated 1-halomethyl- or 1-sulphonyloxymethyl-3-oxo-2-oxa-5α- or -5β-androstanes are reacted with a metal azide, especially an alkali metal azide such as potassium or sodium azide, or silver azide, in a suitable solvent, preferably at an elevated temperature.

As starting materials containing a 1-halomethyl group there are used in the first place the chloro-, iodo- or bromo-compounds, and as sulphonic acid esters of 1-hydroxy-methyl compounds especially those which are derived from lower aliphatic or monocyclic aromatic sulphonic acids such as methanesulphonic or para-toluenesulphonic acid.

The starting materials are accessible, for example, by esterification of 1-hydroxymethyl-3-oxo-2-oxa-17R-5α- or -5β-androstanes, in which R is a free or functionally modified oxo group or a protected hydroxyl group together with a hydrogen atom or with a lower aliphatic hydrocarbon residue, which can be prepared by the process of our French Pat. 1,502,384 with a hydrohalic acid in the presence of a dehydrating agent, such as sulphulric acid or zinc chloride, or the halides of phosphorus such as phosphorus trichloride, tribromide or triiodide, or with halides of the said sulphonic acids, for example mesylchloride or tosylchloride, in the presence of pyridine or other tertiary bases. The halides, for example the iodide, are preferably prepared from the sulphonic acid esters by reaction with the corresponding alkali metal halides, for example sodium iodide, in a suitable solvent, such as acetone or dimethyl-formamide.

For the reaction of a 1-halomethyl-3-oxo-2-oxa-androstane with a metal azide it is preferred to use an aqueous or anhydrous solvent; for example when sodium azide is used, it is advantageous to use aqueous ethanol, and in this case the reaction mixture is kept refluxing for a prolonged time. Instead of an alcohol there may be used a ketone, for example acetone. When silver azide is used, the reaction is preferably performed in an anhydrous solvent such as methylenechloride. The reaction of the sulphonic acid ester of the 1-hydroxymethyl-3-oxo-2-oxa-androstane compound with sodium azide or potassium azide is likewise most advantageously carried out by refluxing in an alcohol or in diemthylsulphoxide.

A possibly desired conversion of free into functionally modified hydroxyl or oxo groups or vice versa is carried out in the usual manner. The 17α-hydrocarbon residue mentioned above can likewise in known manner be introduced into a resulting 1-azidomethyl-3-oxo-2-oxa-androstane containing a 17-oxo group, for example by reaction with a Grignard compound such as methylmagnesiumbromide or a metal compound of an unsaturated hydrocarbon, such as sodium acetylide.

According to the process of the French patent mentioned above the said 1-hydroxy-methyl-3-oxo-2-oxa-steroids are obtained by irradiating 3-oxo-1,2-dihydroxy-steroids or their 2-esters with ultraviolet light. By using in that process as starting materials the readily accessible compounds in which the 1-hydroxyl group is in the cis-position relative to the tertiary hydrogen atom in position 5 of the steroid, there are obtained 1-hydroxyl-methyl-3-oxo-2-oxa-steroids that contain the hydroxymethyl group in trans-position to the 5H-atom, and from them the corresponding compounds containing the hydroxymethyl group in cis-position to the 5H-atom can be manufactured as follows:

1α-hydroxymethyl- or 1β-hydroxymethyl-3-oxo-2-oxa-5β- or -5α-androstanes are first converted into 1α-aldehydo-3-alkoxy-2-oxa-5β-androstanes or 1β-aldehoxy-2-oxa-5α-androstanes in the following manner:

Reduction by means of sodium borohydride, etherification of the 3-hydroxyl group formed, for example with hydrochloric acid+methanol and oxidation of the 1-hydroxymethyl group, for example in dimethylsulphoxide in acetic anhydride. By epimerization of the aldehyde group in 1-position by treatment with strong alkalies, for example with sodium methylate in an alcoholic, for instance methanolic solution, the 1β-aldehydo-3-alkoxy-2-oxa-5β-androstane or 1α-aldehydo-3-alkoxy-2-oxa-5α-androstane compounds respectively are accessible. In these compounds the aldehyde group is reduced with sodium borohydride to the alcohol group which, as described above, is esterified with a hydrohalic acid or with an alkylsulphonic or arylsulphonic acid, the 3-ether group is subjected to a mild acid hydrolysis and the resulting hydroxyl group is dehydrogenated to the oxo group. All these reactions can be carried out in known manner.

The invention concerns also those variants of the process in which an intermediate obtained at any stage of the process is used as starting material and the remaining steps are carried out or in which a starting material is formed in situ.

Another object of this invention are the new starting materials to be used in the performance of the above processes, that is to say 17-oxygenated 1ξ-halomethyl-3-oxo-2-oxa-5α- and -5β-androstanes and 1ξ-alkyl- or 1ξ-arylsuphonyloxymethyl-3-oxo-2-oxa-5α- and -5β-androstanes, in which the substituent in position 1 may be α-positioned or β-positioned. Special mention among the 1ξ-halomethyl-3-oxo-2-oxa-5α- and -5β-androstanes deserve the 1ξ-iodomethyl and the 1ξ-bromomethyl derivatives and among the 1ξ-alkyl- and 1ξ-aryl-sulphonyloxymethyl-3-oxo-2-oxa-5α- and -5β-androstanes those which are derived from lower aliphatic or monocyclic aromatic sulphonic acids, for example the mesyl and p-tosyl derivatives, especially those of the formulae

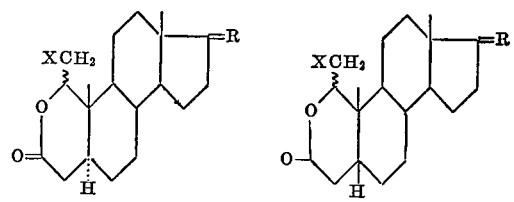

in which P has the same meanings as in Formula II or III and X stands for iodine or bromine or a lower aliphatic or monocyclic arylsulphonyloxy group. Specific compounds are, for example, 1β-mesyloxymethyl-17β-hydroxy-3-oxo-2-oxa-5α-androstane and its 17-esters, especially the acetate, 1β-mesyloxymethyl-3,17-dioxo-2-oxa-5α - androstane, 1β - mesyloxymethyl-17α-methyl-17β-hydroxy - 3 - oxo-2-oxa-5α-androstane, 1β-mesyloxymethyl-17α-ethynyl-17β-hydroxy-3-oxo-2-oxa-5α-androstane and the corresponding compounds having the opposite configuration in positions 1 and 5 and the corresponding compounds that contain instead of the mesyloxy group the tosyloxy group or an iodine or bromine atom.

The invention further includes the new compounds obtained in the course of the manufacture of the starting materials, in which the substituent in position 1 is cis-positioned to the 5H-atom, especially the 3-alkyl ethers of 17-oxygenated 1β-hydroxymethyl-3-hydroxy-2-oxa-5β-androstanes and 17-oxygenated 1α-hydroxymethyl-3-hydroxy-2-oxa-5α-androstanes and their hydrohalic acid and sulphonic acid esters, for example esters of the hydriodic or hydrobromic acid or of a lower aliphatic or monocyclic sulphonic acid and the corresponding compounds containing a free 3-hydroxyl group, especially those of the formulae

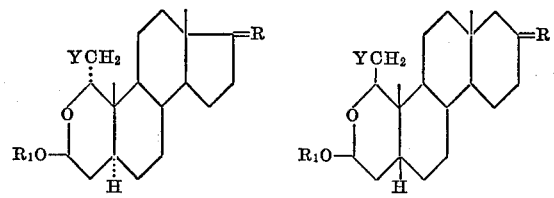

in which R has the same meanings as in Formula II or III and $R_1$ stands for hydrogen or an alkyl group, especially a lower alkyl group, and Y stands for a hydroxyl group which may be free or esterified with a hydrohalic acid, especially hydriodic or hydrobromic acid or with a sulphonic acid, especially with a lower aliphatic or monocyclic aromatic sulphonic acid, such as methanesulphonic or para-toluenesulphonic acid.

The present invention is also concerned with the manufacture of pharmaceutical preparations for use in human or veterinary medicine containing the said new pharmacologically active substances of the present application as active ingredient together with a pharmaceutical excipient. Suitable excipients are organic or inorganic substances suitable for enteral, for instance oral, parenteral or local administration. Suitable excipient bases are substances that do not react with the new compounds, for example water, gelatin, lactose, starches, magnesium stearate, talcum, vegetable oils, benzyl alcohols, gums, polyalkyleneglycols, white petroleum jelly, cholesterol and other medicinal excipients. The pharmaceutical preparations may be in solid form, for example tablets, dragees or capsules, or in liquid or semiliquid form solutions, suspensions, emulsions, ointments or creams. These pharmaceutical preparations may be sterilized and/or contain assistants such as preserving, stabilizing, wetting or emulsifying agents, salts for regulating the osmotic pressure or buffers. They may also contain other therapeutically valuable substances. The new compounds may also be used as starting products for the manufacture of other valuable compounds.

The compounds of the present application may also be used as additives to animal fodder.

The following examples illustrate the invention.

EXAMPLE 1

A mixture of 800 mg. of 1β-mesyloxymethyl-3-oxo-17β-acetoxy-2-oxa-5α-androstane, 2.4 g. of sodium azide and 40 ml. of absolute, freshly distilled dimethylsulphoxide is stirred and heated for 48 hours at 80° C., then cooled, poured over ice, extracted with ethyl acetate and washed with sodium carbonate solution and then with water. The crude product obtained after evaporation is chromatographed in ethyl acetate solution on silicagel, whereby, in addition to 210 mg. of unreacted starting material, 490 mg. of 1β-azidomethyl-3-oxo-17β-acetoxy-2-oxa-5α-androstane melting at 165° C. (after three recrystallizations from acetone+petroleum ether) are eluted. Optical rotation $[\alpha]_D = +35°$ (0.5). Infrared: 2120, 1730 and 1250 cm.$^{-1}$.

The starting material can be prepared thus:

3 grams of Δ$^1$-3-oxo-17β-acetoxy-5α-androstane in 40 ml. of tertiary butanol are mixed with 0.5 g. of potassium chlorate in 25 ml. of water, then 250 mg. of osmium tetroxide are added and the whole is stirred for 48 hours in the dark at room temperature. The batch is then diluted with ethyl acetate and washed with 10% ice-cold soda solution and then with water. The organic phase is evaporated under vacuum and the crude product left is filtered in ether over silicagel (grain size 0.05–0.2 mm.; extremely pure; Merck). After one crystallization of the eluates from acetone+petroleum ether there are obtained 2.5 g. of 1α, 2α - dihydroxy-3-oxo-17β-acetoxy-5α-androstane melting at 181–193° C. Optical rotation $[\alpha]_D = +34°$ (c=0.26). Infrared: 3570–3490, 1715 and 1255 cm.$^{-1}$.

3 grams of the resulting product in 200 ml. of absolute benzene are irradiated for 6 hours (mercury high-pressure burner in quartz vessel). The crude product obtained on evaporation of the solution is chromatographed in an acetone+petroleum ether 1:1-solution on silicagel, to yield 2.1 g. of crystalline 1β-hydroxymethyl-3-oxo-17β-acetoxy-2-oxa-5α-androstane which, after one recrystallization from acetone+petroleum ether, melts at 202° C. (1.9 g.). Optical rotation $[\alpha]_D = +27°$ (c=0.66). Infrared: 3600, 1720 (broad) and 1255 cm.$^{-1}$.

1 gram of this product in 5 ml. of pyridine is mixed with 1 ml. of methanesulphonylchloride and kept for 4 hours at room temperature, then poured into ice-cold sodium bicarbonate solution, extracted with ethyl acetate and washed successively with water, dilute sulphuric acid and once more with water. The organic phase is dried and evaporated and the resulting crude product filtered in methylenechloride through neutral alumina of activity III, and the eluates are crystallized from acetone+petroleum ether. The resulting 1β-mesyloxymethyl-3-oxo-17β-acetoxy-2-oxa-5α-androstane melts at 198° C. (0.71). Optical rotation $[\alpha]_D = +3$ (0.48). Infrared: 1720, 1350, 1250 and 1170 cm.$^{-1}$.

EXAMPLE 2

390 mg. of 1β-azidomethyl-3-oxo-17β-acetoxy-2-oxa-5α-androstane are dissolved in a mixture of 20 ml. of methanol and 3 ml. of 10% aqueous potassium carbonate solution and the solution allowed to stand at room temperature overnight. The reaction solution is diluted with water, rendered acid to Congo red with 2N-hydrochloric acid, and extracted with methylene chloride. The methylene chloride extract is washed several times with water, dried over sodium sulfate and evaporated completely. The resulting crude product is dissolved in ethyl acetate and chromatographed over silica gel. It yields 200 mg. of 1β - azidomethyl-3-oxo-17β-hydroxy-2-oxa-5α-androstane which after recrystallization from acetone-petroleum ether melts at 133–134° C. $[\alpha]_D = +51°$. IR: 3600, 2120, 1725 cm.$^{-1}$.

We claim:

1. A member selected from the group consisting of compounds of the formulae

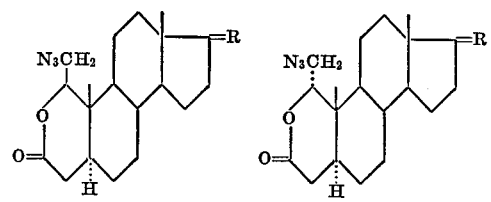

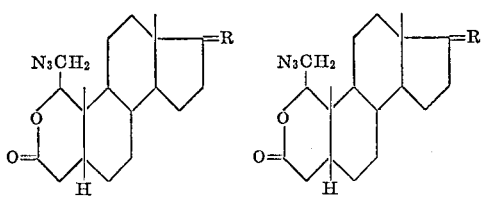

in which R represents a member selected from the group consisting of an oxo group, a lower alkylenedioxy group, a free, an esterified and an etherified hydroxy group together with a hydrogen atom or a free, an esterified and an etherified hydroxy group together with a member selected from the group consisting of a lower alkyl group, a lower alkenyl group, a lower alkynyl group and a lower haloalkynyl group, each of said esterified hydroxyl groups being derived from a member selected from the group consisting of a carboxylic acid having 1 to 18 carbon atoms, a phosphoric acid and a sulfuric acid, and each of said etherified hydroxyl groups being derived from an alcohol having 1 to 8 carbon atoms.

2. A compound as claimed in claim 1, and which is a member selected from the group consisting of 1β-azidomethyl-3-oxo-17β-hydroxy-2-oxa-5α-androstane and a 17-ester thereof, said 17-ester being derived from a member selected from the group consisting of a carboxylic acid having 1 to 18 carbon atoms, a sulfuric acid and a phosphoric acid.

3. A compound as claimed in claim 1, and which is the 17-acetate of the 1β-azidomethyl-3-oxo-17β-hydroxy-2-oxa-5α-androstane.

4. A compound as claimed in claim 1, and which is the 1β-azidomethyl-3,17-dioxo-2-oxa-5α-androstane.

5. A compound as claimed in claim 1, and which is the 1β-azidomethyl-3-oxo-17α-methyl-17β-hydroxy-2-oxa-5α-androstane.

6. A compound as claimed in claim 1, and which is the 1β-azidomethyl-3-oxo-17α-ethynyl-17β-hydroxy-2-oxa-5α-androstane.

7. A compound as claimed in claim 1, and which is a member selected from the group consisting of 1α-azidomethyl-3-oxo-17β-hydroxy-2-oxa-5β-androstane and 17-esters thereof, said 17-ester being derived from a member selected from the group consisting of a carboxylic acid having 1 to 18 carbon atoms, a sulfuric acid and a phosphoric acid.

8. A compound as claimed in claim 1, and which is the 1α-azidomethyl-3,17-dioxo-2-oxa-5β-androstane.

9. A compound as claimed in claim 1, and which is the 1α-azidomethyl-3-oxo-17α-methyl-17β-hydroxy-2-oxa-5β-androstane.

10. A compound as claimed in claim 1, and which is the 1α-azidomethyl-3-oxo-17α-ethynyl-17β-hydroxy-2-oxa-5β-androstane.

11. Process for the manufacture of 17-oxygenated 1-azidomethyl-3-oxo-2-oxa-steroids of the 5α- and 5β-androstane series which comprises converting into the azidomethyl group the esterified 1-hydroxymethyl group in reactive esters of corresponding 1-hydroxymethyl-3-oxo-2-oxa-steroids of the 5α-androstane and 5β-androstane series respectively by treatment with a metal azide in a solvent.

12. Process as claimed in claim 11, wherein the conversion is effected by treatment with an alkali metal azide.

13. Process as claimed in claim 11, wherein the conversion is effected by treatment with silver azide.

14. Process as claimed in claim 11, wherein an alcohol is used as solvent.

15. Process as claimed in claim 11, wherein dimethylsulfoxide is used as solvent.

References Cited

UNITED STATES PATENTS 3,246,014    4/1966    Jung et al. _____ 260—343.2

JOHN D. RANDOLPH, Primary Examiner

J. M. FORD, Assistant Examiner

U.S. Cl. X.R.

260—295, 295.5, 338, 340.7, 340.9, 345.2, 999